Figure 1:
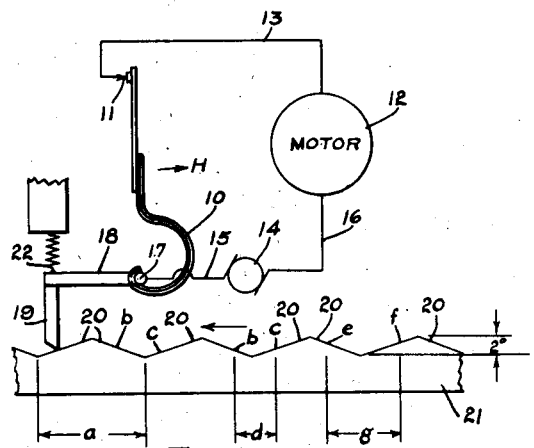

May 30, 1939.   D. G. TAYLOR   2,160,042
MEANS FOR CONTROLLING A PHYSICAL CONDITION
Filed Oct. 13, 1933   2 Sheets—Sheet 1

INVENTOR
DANIEL G. TAYLOR
By Paul, Paul & Moore
ATTORNEYS

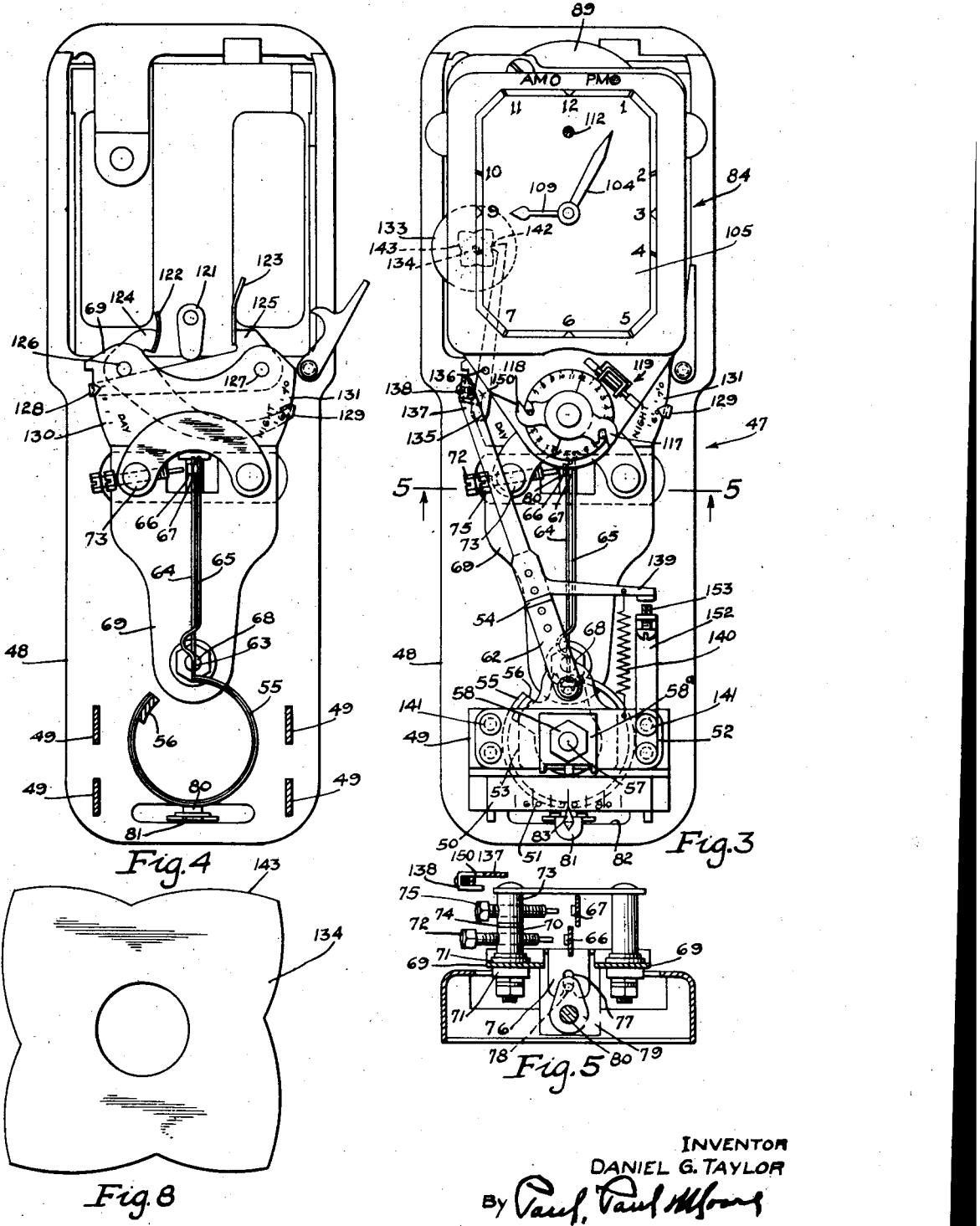

UNITED STATES PATENT OFFICE 2,160,042

MEANS FOR CONTROLLING A PHYSICAL CONDITION

Daniel G. Taylor, Minneapolis, Minn., assignor to Minneapolis-Honeywell Regulator Company, Minneapolis, Minn., a corporation of Delaware Application October 13, 1933, Serial No. 693,443

3 Claims. (Cl. 236—46)

The present invention relates to improvements in the control of a physical condition and has for its principal object the provision of a means by which a physical condition can be maintained at a reasonably constant value and by which fluctuations of the physical condition outside of a relatively narrow range within which it is permissible for the condition to fluctuate can be eliminated. The invention has particular utility in the control of temperature or the like for domestic purposes wherein the heat producing apparatus is remote from the space to be heated so that there is a time lag between the generation of the heat and its dissipation into the space to be heated although it is likewise applicable to refrigerating systems or heating systems wherein the supply of steam from a central or municipal heating plant is controlled by means of thermostatically operated valves.

In prior art systems of control, for temperature for example, it has been proposed to operate the heat increasing apparatus whenever the temperature of the space to be heated fell below a predetermined temperature. By the time the heat thus supplied began to be dissipated in the space, the temperature thereof had generally fallen considerably below the desired point. Likewise the heat increasing apparatus would be operated to decrease the supply of heat when a predetermined maximum temperature had been reached but by the time all of the heat supplied had been dissipated into the space to be heated, the temperature thereof would have risen considerably above the desired maximum. These difficulties were due to the inherent lag and overshooting that is present in any heating system and particularly in those types wherein the fire is produced by a fluid fuel burner that is started and stopped according to room temperatures.

In the present system as applied to temperature control, a comfort zone is determined within which the temperature may fluctuate slowly without giving a feeling of discomfort. The heat increasing apparatus is then operated at intervals sufficiently long to maintain the space to be heated within that comfort zone and the intervals are varied or proportioned in accordance with the departure of the temperature from one of the limits of the comfort zone.

More specifically my invention includes a switching mechanism for controlling the operation of a heat increasing apparatus which switching mechanism is conjointly controlled by a thermostatic device and a timing device in such a manner that when the temperature of the space to be heated is above the high limit of the comfort zone, the heat increasing apparatus is not operated to supply heat at any time and when the temperature of the space to be heated is below the low limit of the comfort zone the heat increasing apparatus is operated to supply heat all the time. For any temperature between the high limit and the low limit of the comfort zone, the heat increasing apparatus is operated to supply heat in proportion to the departure of the temperature from one of the limits of the comfort zone. In actual practice it follows that for any constant outdoor conditions (this includes outdoor temperature, wind velocity and direction, and condition of the sun) the temperature of the space to be heated will level off at some constant value between the high and low limits of the comfort zone. When there is a change in outdoor conditions, the temperature of the space to be heated will level off at some new value over an extended period of time and this new value will also be within the comfort zone. In this manner, the temperature of the space to be heated is allowed to fluctuate between the limits of the comfort zone over a long period of time with the result that the change is so slow and of such small magnitude that it is not noticed and occupants of the space to be heated remain in perfect comfort.

A further object of the invention is the provision of a thermostatic device in which a single motor serves to tell the time of day or night, adjust the thermostat for day and night settings, indicate whether the thermostat is on day or night setting and additionally cooperates with the thermostat to operate the heat increasing apparatus for varying periods of heat supply dependent upon the departure of the temperature of the space to be heated from one of the limits of a comfort zone.

Further objects of the invention will become apparent as the description thereof proceeds.

Figure 9:
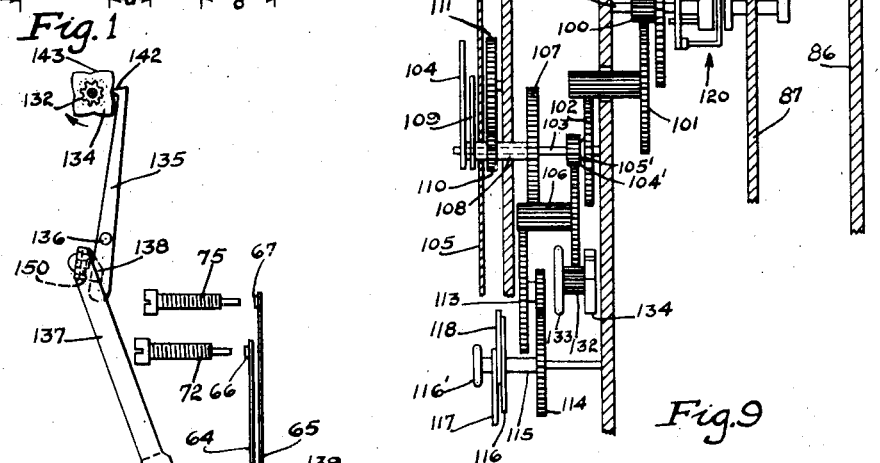
Figures 2, 6:
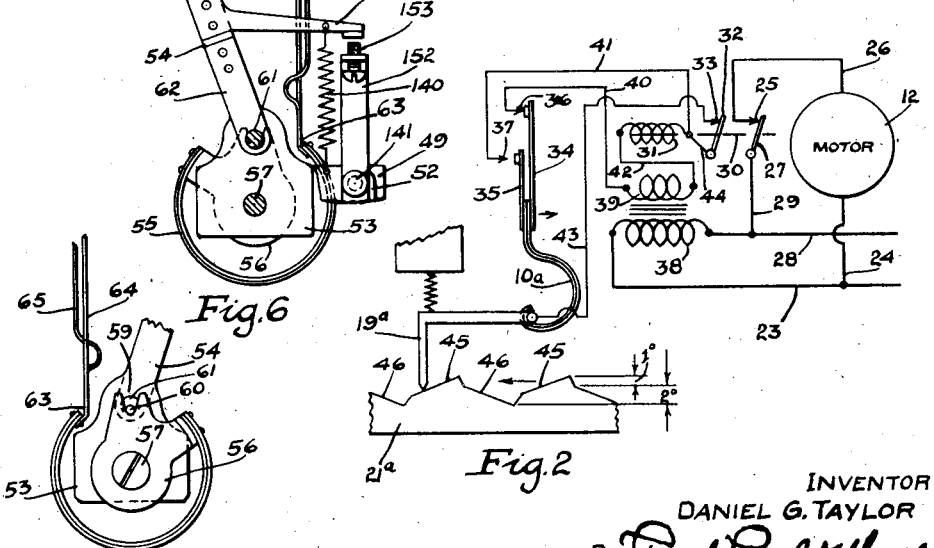
Figure 7:
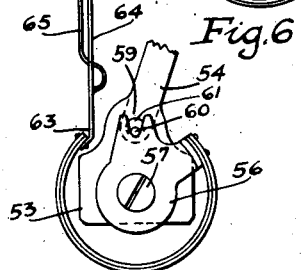

For a more complete understanding of the invention, reference may be had to the following description and the accompanying drawings, in which Fig. 1 is a diagrammatic showing illustrative of the principle of the invention, Fig. 2 is a diagrammatic showing illustrative of the manner in which the invention may be applied to the well-known holding type circuit arrangement, Fig. 3 is a front view of a commercial room thermostat with the invention applied thereto and the cover removed, Fig. 4 is a view similar to Fig. 3 with the clock unit removed and certain parts in section, Fig. 5 is a sectional view taken about on line 5—5 of Fig. 3 and with the clock unit removed, Fig. 6 is a diagrammatic view of the timed adjusting means for the thermostat of Fig. 3, Fig. 7 is a bottom view of certain of the parts of Fig. 6, Fig 8 is an enlarged view of the cam used to approximate the action shown diagrammatically in Fig. 2, and Fig. 9 is a stretchout of the gear train of the clock unit.

Referring to Fig. 1 a bimetallic thermostatic element is shown at 10. The element 10 is subjected to the temperature of the space to be heated and upon temperature fall engages a contact 11 which is connected to a motor 12 by a wire 13. The motor 12 is herein used to represent any suitable type of heat increasing apparatus. Element 10 is connected to a source of power 14 by a wire 15 and motor 12 is also connected thereto by a wire 16. Element 10 is pivoted at 17 and a lever 18 is secured to the pivotal point of element 10. Secured to lever 18 is a cam follower 19 which cooperates with the sloping surfaces 20 of a cam 21 herein shown as an endless strip. Follower 19 is continuously biased into engagement with cam 21 by spring 22. For the purposes of this explanation it is assumed that cam 21 is moving in the direction of the arrow at a constant speed such that a period of fifteen minutes is required for a complete cycle, that is, for each portion such as indicated at a to move under the follower 19. The throw of the cam surfaces 20, or the distance through which follower 19 will be moved is equal to a temperature change of 2° at the element 10.

With the parts in the position of Fig. 1, the temperature of the room is between 68° and 70° and the conjoint action of this temperature and the cam mechanism is such that element 10 is lightly touching contact 11 and the motor 12 is operating to supply heat to the room. Cam 21 is moving in the direction of the arrow and therefore follower 19 will ride up one of the cam surfaces 20 which action will rotate element 10 about its pivot 17 breaking the circuit to motor 12. If the room temperature remains constant, the circuit to motor 12 will remain broken until follower 19 rides down a cam surface 20 to a point b at which time element 10 will have been rotated about its pivot in a counter-clockwise direction to such an extent that the circuit to motor 12 is closed. The circuit to motor 12 will remain closed until follower 19 rides up the next cam surface 20 to a point c. This action will repeat itself over and over so as to operate motor 12 for intervals indicated by d as long as the room temperature remains constant.

If the room temperature should fall slightly due to a change in outdoor conditions, the end of element 10 will move toward the left and motor 12 will be energized when follower 19 reaches some new point e on one of the cam surfaces 20 and the motor 12 will remain energized until the follower 19 reaches some new point f on the next cam surface 20. This will give operating periods of motor 12 represented by the distance g and these periods will remain constant as long as the outdoor conditions do not change again.

It will be noted that the operating periods of motor 12 as represented by g are somewhat longer than the periods represented by d. Likewise if the outdoor conditions should change so as to cause the room temperature to rise above the first value, then the operating periods would become shorter than d.

If the room temperature rises above 70°, element 10 will move so far to the right that it will not engage contact 11 even when follower 19 engages the lowermost depressions of cam 21 and if the room temperature falls below 68 degrees the element 10 will move so far to the left that it will not leave contact 11 even when the follower 19 engages the peaks of the cam 21. In this manner the heat increasing apparatus is variably operated for none of the time to one-hundred percent of the time upon a minimum change of 2° in room temperature. For any room temperature within the 2° differential the heat increasing apparatus is operated intermittently for periods which vary in proportion to the departure of the temperature from one of the limits of the differential or comfort zone.

Turning now to Fig. 2, the motor 12 is shown as being controlled by the well-known holding type of relay and thermostat. One side of motor 12 is connected to line 23 by a wire 24 and the other side of motor 12 is connected to a contact 25 by a wire 26. A switch arm 27 which is adapted to engage contact 25 is connected to the other line 28 by a wire 29. Switch arm 27 is controlled by the armature 30 of a relay having a coil 31. Armature 30 also controls a second switch arm 32 which engages a contact 33 upon energization of relay coil 31. The thermostatic element 10a of Fig. 2 controls two flexible blades 34 and 35 which sequentially engage contacts 36 and 37 on temperature fall. Lines 23 and 28 are connected to the high voltage primary 38 of a transformer having a low voltage secondary 39.

As is well known in the art, when blades 34 and 35 engage their contacts 36 and 37 on temperature fall at the thermostatic element 10a, an energizing circuit for relay coil 31 is established as follows: secondary 39, wire 40, contact 36, blades 34 and 35, contact 37, wire 41, relay coil 31 and wire 42 back to the secondary 39. Armature 30 is thereby attracted moving switch arm 27 into engagement with contact 25 to set up a circuit—line 23, wire 24, motor 12, wire 26, contact 25, switch arm 27, wire 29 to line 28—for motor 12 and also moves switch arm 32 into engagement with contact 33 to establish a holding circuit for relay coil 31 as follows: secondary 39, wire 40, contact 36, blade 34, element 10a, wire 43, contact 33, switch arm 32, wire 44, relay coil 31, and wire 42 to secondary 39. In this type of circuit it will be apparent that there is a temperature differential between the energizing of motor 12 and the deenergizing thereof, and this temperature differential is equal to the differential setting of the blades 34—35 and contacts 36—37. In other words motor 12 is not energized until both blades engage their respective contacts, but motor 12 remains energized after blade 35 disengages contact 37 and until blade 34 disengages contact 36. For this explanation, the differential between these blades and respective contacts has been taken as 1 degree.

In order to apply the present invention to a thermostat of the holding circuit type it is desirable for the off-portions 45 of the cam 21a to be higher than the on portions 46 of the cam 21a by an amount which is equal to the differential setting between the blades 34 and 35. In this manner when the follower 19a rides off the peak of one of the off portions 45, it will substantially immediately drop an amount corresponding to the differential setting between the blades 34 and 35 and likewise when the follower 19a leaves the lower-most part of one of the on portions 46, it will be substantially immediately lifted an amount equal to the differential setting of the blades 34 and 35. By this arrangement it is possible to provide the same action on a thermostat of the holding type as would be obtained with a simple cam and a single contact thermostat as shown in Fig. 1. It will be appreciated however, that one might, if desired, use a cam of the type shown in Fig. 1 with a holding circuit type of room thermostat to produce periodic burner operation which varies with departure of room temperature from a selected value or range. In such a case it is preferable to have the throw of the cam equal to the predetermined range within which it is permissible for the room temperature to fluctuate plus the fixed differential of the thermostat. Obviously, various shaped cams and various types of thermostats may be employed to provide selected frequencies to cause the burner to operate for amounts of time varying with the departure of the room temperature from predetermined values.

Referring now to Figs. 3 to 9 inclusive, the invention is shown applied to a commercial device commonly termed a room thermostat which is generally indicated at 47 in Fig. 3. The room thermostat comprises a base 48 to the lower end of which is secured a bridging member 49 the lower portion 50 being provided with graduations 51 and the upper portion of which is constituted by a piece of electrical and heat insulating material 52. Secured to the under side of insulating member 52 is a second piece of insulating material 53 which is provided with a tongue 54 that extends upwardly and to the left. A curved bimetallic element 55 has one of its ends secured to a bracket 56 which carries a bolt 57 that extends upwardly through the pieces of insulating material 53 and 52 and a nut 58 holds these various parts together there being a spring washer 58a interposed between nuts 58 and 52 to obviate play between the parts. Bracket 56 is provided with a slot 59 that receives a small pin 60 which is mounted eccentrically with respect to a larger pin 61 that is rotatably mounted in the piece of insulating material 53. A metallic strip 62 is secured to part of the tongue 54 for strengthening the same and is provided with an opening for receiving pin 61. If tongue 54 and metallic strip 62 are rotated about the pivot provided by screw 57, then eccentric pin 60 will engage the sides of slot 59 to cause a corresponding movement of bracket 56 and bimetallic element 55. If pin 61 is rotated, the eccentric pin 60 will cause slight rotation of bracket 56 in respect to insulating material 53 and in this manner a factory adjustment is obtained for bimetallic element 55. Secured to the other end of bimetallic element 55 is a flexible blade 63 which is split throughout the greater portion of its length so as to provide flexible blades 64 and 65 which carry contacts 66 and 67.

Pivotally mounted on base 48 at 68 is a plate 69 provided with a post 70 which is electrically insulated from plate 69 by means of insulating washers 71. A contact screw 72 is threaded into post 70 and cooperates with contact 66 carried by blade 64. A second post 73 is secured to the upper portion of post 70 through an insulating connector 74 and a second contact screw 75 passes through post 73 and cooperates with contact 67 carried by blade 65. Plate 69 is provided with an extension 76 which is bent at right angles to the plane of plate 69 and is provided with a slot 77 which receives a pin 78 that is secured to a member 79 carried by a rod 80. Rod 80 extends behind base 48 and suitably supported in bearings carried by base 48 (not shown) and the lower portion of rod 80 carries a manually operable shifting lever 80 which extends through a slot 82 in base 48. Manually operable lever 81 is provided with a pointer 83 which cooperates with graduations 51. By this mechanism it is possible to shift plate 69 on its pivot 68 by means of lever 81 and this action moves contact screws 72 and 75 toward or away from contacts 66 and 67 so as to provide a manual adjustment for the room thermostat.

Base 48 carries a clock unit which is generally indicated at 84. The clock unit is diagrammatically shown in Fig. 9 and comprises supporting plates 85, 86, 87, and 88. Supporting plate 85 carries a motor 89 which in this particular instance is one of the so-called self-starting subsynchronous motors in which the rotor shaft 90 makes 200 revolutions per minute. In this particular type of motor the rotor and rotor shaft are not definitely secured to the motor, so a leaf spring 91 is secured to plate 86 and bears against the end of rotor shaft 90 to hold the same in its proper position. Rotor shaft 90 carries a pinion 92 which engages a gear 93 secured to a shaft 94 which is mounted in plates 85 and 86. Shaft 94 carries a pinion 95 which meshes with a gear 96 that carries a pinion 97 which in turn meshes with a gear 98 that is secured to a shaft 99 and pinion 100. Pinion 100 drives a gear and pinion assembly 101 the pinion of which extends through plate 85 and meshes with a gear 102 which is loosely mounted on a shaft 103. The shaft 103 is the minute shaft of the clock unit and carries a minute hand 104 which cooperates with a clock dial 105. Shaft 103 also carries a pinion 104' which is secured to the shaft in any suitable manner and the pinion 104 is frictionally connected to gear 102 by a friction washer 105'. Pinion 104' drives a gear and pinion assembly 106, the pinion of which drives a gear 107 which is secured to a hollow shaft 108 that is journalled on shaft 103 and extends through dial 105 to carry an hour hand 109. Hollow shaft 108 has a pinion 110 secured to it between plate 88 and dial 105, and this pinion 110 drives a gear 111 half of which is white and the other half of which is black and may be viewed through a sight opening 112 which is provided in dial 105.

The pinion of gear and pinion assembly 106 also drives a gear and pinion assembly 113 the pinion of which in turn drives a gear 114 carried by shaft 115 to which is secured a 24 hour dial 116. A pair of trip arms 117 and 118 are adjustably secured to shaft 115 by thumb nut 116'. These trip arms may be set to correspond to any desired hour of the day and night and cooperate with a tripping mechanism generally indicated at 119 which in turn operates a clutching mechanism generally indicated at 120 which when operated drives a cam 121 for one-half of a revolution. Cam 121 cooperates with shoes 122 and 123 that are formed on one of the ends of bell cranks 124 and 125 which are pivoted to plate 69 at 126 and 127. The other ends of bell cranks 124 and 125 are bent over plate 69 to form pointers 128 and 129 that cooperate with graduations 130 and 131 formed on plate 69.

Shaft 115 is driven through one revolution every 24 hours and the trip arms 117 and 118 operate tripping mechanism 119 and clutching mechanism 120 at predetermined hours according to the adjustment of trip arms 117 and 118 in order to move cam 121 through successive half revolutions and the cam 121 cooperates with shoes 122 and 123 to shift plate 69 in order to provide day and night adjustments for the thermostat.

The gear of gear and pinion assembly 106 drives a pinion 132 which is secured to a hand set device 133. Rotation of hand set device 133 simultaneously adjusts minute hand 104, hour hand 109, day-night indicator 111, and 24 hour dial 116.

The clock unit 84 as above described and the manner in which plate 69 is shifted for day and night settings of the room thermostat 47 is not new with applicant and further details of the manner in which the tripping and clutching mechanisms and other parts operate may be obtained by reference to the co-pending application of Andrew G. McNicoll which bears Ser. No. 595,460, and was filed February 27, 1932.

A cam 134 is secured to pinion 132 and the gear ratio between pinion 132 and minute shaft 103 is such that cam 134 is rotated once an hour. The cam 134 in the present instance is provided with four lobes so as to give 15 minute cycles and an enlarged view of this cam is shown in Fig. 8. The cam 134 as shown in Fig. 8 is designated to operate a thermostatic device of the holding circuit type in accordance with the present invention. Cam 134 operates a lever 135 which is pivoted to plate 85 of the clock unit as shown at 136. A lever 37 has its lower end secured to tongue 54, its upper end terminating adjacent the lower end of lever 135. The upper end of lever 137 is provided with a bent-over portion 138 which lies under the lower end of lever 135 whereby the lower end of lever 135 lies between lever 137 and its bent-over portion 138. A contact plate 150 is adjustably secured to lever 137 and serves to adjust the point of contact between lever 135 and 137 whereby the movement imported to lever 137 by cam 134 may be adjusted. Lever 137 is also provided with a substantially horizontal extension 139 to which one end of a coil spring 140 is secured, the other end of coil spring 140 being fastened to the piece of insulating material. A bracket 152 is secured to bridge member 49 and extends upwardly therefrom, terminating first below extension 139 and carries an adjustable screw 153 which presents undue rotation of lever 137 in a clockwise direction by spring 140 whereby the clock unit may be removed for repair or replacement without rendering the thermostatic control entirely inoperative.

In operation, motor 89 drives cam 134 in a clockwise direction as viewed in Figs. 3 and 6. The end 142 of lever 135 rides up one of the surfaces 143 of cam 134 which action moves lever 137 in such a direction as to rotate bimetallic element 55 about its pivot 57 in a counter clockwise direction to bring contacts 66 and 67 closer to or into actual engagement with contact screws 72 and 75 depending upon the temperature of the thermostatic element 55. When one of the high points of cam 134 passes under the end 142 of lever 135, the action of spring 140 working through lever 137 and lever 135 causes cam 134 to quickly move a small amount in a clockwise direction thereby taking up the lost motion in the gear train and giving the quick drop which is substantially equal to the differential between blades 64 and 65 as previously explained in connection with Fig. 2. When one of the low points of cam 134 comes into engagement with the end 142 of lever 135 the cam 134 will stop for a short time until the lost motion of the gear train is again taken up. In this manner the thermostat operates the burner continuously when the temperature of the room is too low, completely discontinues operation of the burner when the room temperature is too high, and operates the burner intermittently at an indeterminate percentage of each cycle dependent upon the departure of the room temperature from a predetermined value when the room temperature is between the high and low limits.

From the foregoing description it will be apparent that the present invention provides a system and method of control for a physical condition in which the physical condition is allowed to fluctuate within a predetermined zone. This zone, however, can be narrowed down to such an extent as to maintain the physical condition within any desired limits. By correcting the physical condition in accordance with its departure from one of the limits of the predetermined zone, the rate of change is made so slow that such fluctuations are not detrimental.

Such a system has particular utility in the control of temperature since it is permissible to allow temperature to fluctuate within small predetermined limits if the fluctuations are not rapid. As applied to heating systems there is probably some relation between the lag in the heating system and the length of time required for moving each lobe of the cam past the cam follower. Although no definite relation has been found as yet experiments indicate that a fifteen minute cycle as described in the foregoing description is suitable for a warm air heating system and that a thirty minute cycle is suitable for a hot water or steam system but it is to be understood that the time cycles set out herein are merely exemplary and that other time cycles may be used to obtain the best results on particular heating plants.

It will also be apparent from the foregoing description that the invention provides a novel thermostatic device in which a single motor operates a clock, a day-night shifting mechanism for the thermostatic device, a day-night indicator for indicating whether the thermostat is operating on day or night setting, and a timing apparatus which cooperates with the thermostatic element in the manner above set forth.

Although the invention as herein described as being applied to a clock thermostat of the ordinary type in which the thermostat is automatically adjusted in the morning and in the evening, it will be apparent that the invention is likewise applicable to plain thermostats by the inclusion of a motor which may or may not run at exactly the same speed at all times since any motor which runs with reasonably accurate speeds will be sufficient for the purpose.

While a specific embodiment of the invention has been shown and described, it should be understood that I am only to be limited in the purview of the appended claims.

I claim as my invention:

1. A device of the class described, comprising, in combination, a thermostatic member, a contact controlled thereby, a cooperating contact, a supporting member for the cooperating contact, means for adjusting one of said members at predetermined times to obtain day and night settings of the device, a cam for cyclically adjusting the other member within a relatively narrow range several times during the day and night, and a motor for operating the adjusting means and the cam.

2. A device of the class described, comprising, in combination, a thermostatic member, a contact controlled thereby, a second contact that cooperates with the first contact to control an electrical circuit, a supporting member for the second contact, a day-night shifting device for automatically shifting one of said members at predetermined times during the day and night, a manual device operatively connected to one of said members whereby the same may be manually shifted, a cam for cyclically adjusting one of the members within a relatively narrow range several times during the day and night, and a motor for operating said day-night shifting device and said cam.

3. In combination, a temperature-changer for a space whose temperature is to be controlled, a space-temperature-responsive thermostat having a predetermined differential associated with the temperature-changer for controlling said changer and operative to place said changer in operation at one space-temperature and to render the changer inoperative at another space-temperature, the second space-temperature differing from the first mentioned space-temperature by an amount equal to said differential of the thermostat, and time-operated means associated with the thermostat to adjust the response of the thermostat and including a constantly actuated cam arranged to repeatedly and reversely adjust the thermostat an amount equal to a permissible variation in the space-temperature at a relatively slow rate and, additionally, to adjust the thermostat an amount equal to its above-recited differential each time the direction of adjustment is reversed at a relatively quick rate and in the same direction.

DANIEL G. TAYLOR.

DISCLAIMER 2,160,042.—*Daniel G. Taylor*, Minneapolis, Minn. MEANS FOR CONTROLLING A PHYSICAL CONDITION. Patent dated May 30, 1939. Disclaimer filed October 7, 1940, by the assignee, *Minneapolis-Honeywell Regulator Company*.

Hereby enters this disclaimer to claim 2 of said Letters Patent.
[*Official Gazette November 5, 1940.*]